(12) United States Patent
Hübner et al.

(10) Patent No.: US 6,375,265 B1
(45) Date of Patent: Apr. 23, 2002

(54) ARMREST FOR A VEHICLE SEAT

(76) Inventors: Reinhard Hübner, Remlingrade 1; Arnold Rüsing, Remlingrade 14, both of 42477 Radevormwald (DE)

(*) Notice: Subject to any disclaimer, the term of this patent is extended or adjusted under 35 U.S.C. 154(b) by 0 days.

(21) Appl. No.: 09/651,065

(22) Filed: Aug. 30, 2000

(30) Foreign Application Priority Data

Sep. 2, 1999 (DE) .......................................... 199 41 737

(51) Int. Cl.$^7$ .............................. B60N 2/46; A47C 7/54

(52) U.S. Cl. ............................. 297/411.32; 297/411.38; 297/216.1

(58) Field of Search .................. 297/216.1, 411.32, 297/411.38; 403/92, 93, 95

(56) References Cited

U.S. PATENT DOCUMENTS

| 3,116,093 A | * | 12/1963 | Bosack ........................ 291/417 |
| 4,310,196 A | * | 1/1982 | Vogel .......................... 297/417 |
| 5,733,010 A | * | 3/1998 | Lewis et al. ............ 297/411.32 |
| 6,019,430 A | * | 2/2000 | Magyar et al. ............. 297/367 |

FOREIGN PATENT DOCUMENTS

| DE | 87 08 343.4 U1 | 10/1987 | ............ B60N/1/08 |
| DE | 39 40 895 A1 | 12/1989 | ............ B60N/2/46 |
| DE | 197 04 469 A1 | 7/1998 | ............ A47C/1/03 |
| FR | 2696387 A1 | * 4/1994 | |

OTHER PUBLICATIONS

A drawing of a product sold by Vogel, Kleinsteinbacher Str. 9, D–76228 Karlsruhe–Stopfering, Germany, and described as prior art in the specification.
A drawing of a product sold by ERÜ Kunststofftechnik GmbH, Dahlienstr. 21, D–42477 Radevormwald, Germany, and described as prior art in the specification.

* cited by examiner

Primary Examiner—Peter M. Cuomo
Assistant Examiner—Joseph Edell
(74) Attorney, Agent, or Firm—Renner, Kenner, Greive, Bobak, Taylor & Weber

(57) ABSTRACT

The invention relates to an armrest (1) for a motor vehicle seat (8) with seatback (R), which pivots downwards with its end designed as a disk (1a) about a bearing journal (3) in a housing (2) after the release of a locking device (4), into a release position, and by being raised again is capable of pivoting towards the seatback (R) into its locked position of use. The present invention creates an armrest (1) of this nature, which, with problem-free low-friction switching, and with simple structural means, guarantees a secure position of use, optionally with or without overload protection. To that end, the locking device (4) includes of a setting piston (7), capable of movement approximately radially to the bearing journal (3), and a locking slide (9) capable of displacement therein, in a transverse aperture (7a). The setting piston (7) features an engagement projection which interacts with an engagement recess (11). The locking slide (9) is capable of displacement in the transverse aperture (7a) between two contact edges (5, 6) in the housing (2), between a position which locks the setting piston (7) and a position which releases it.

14 Claims, 9 Drawing Sheets

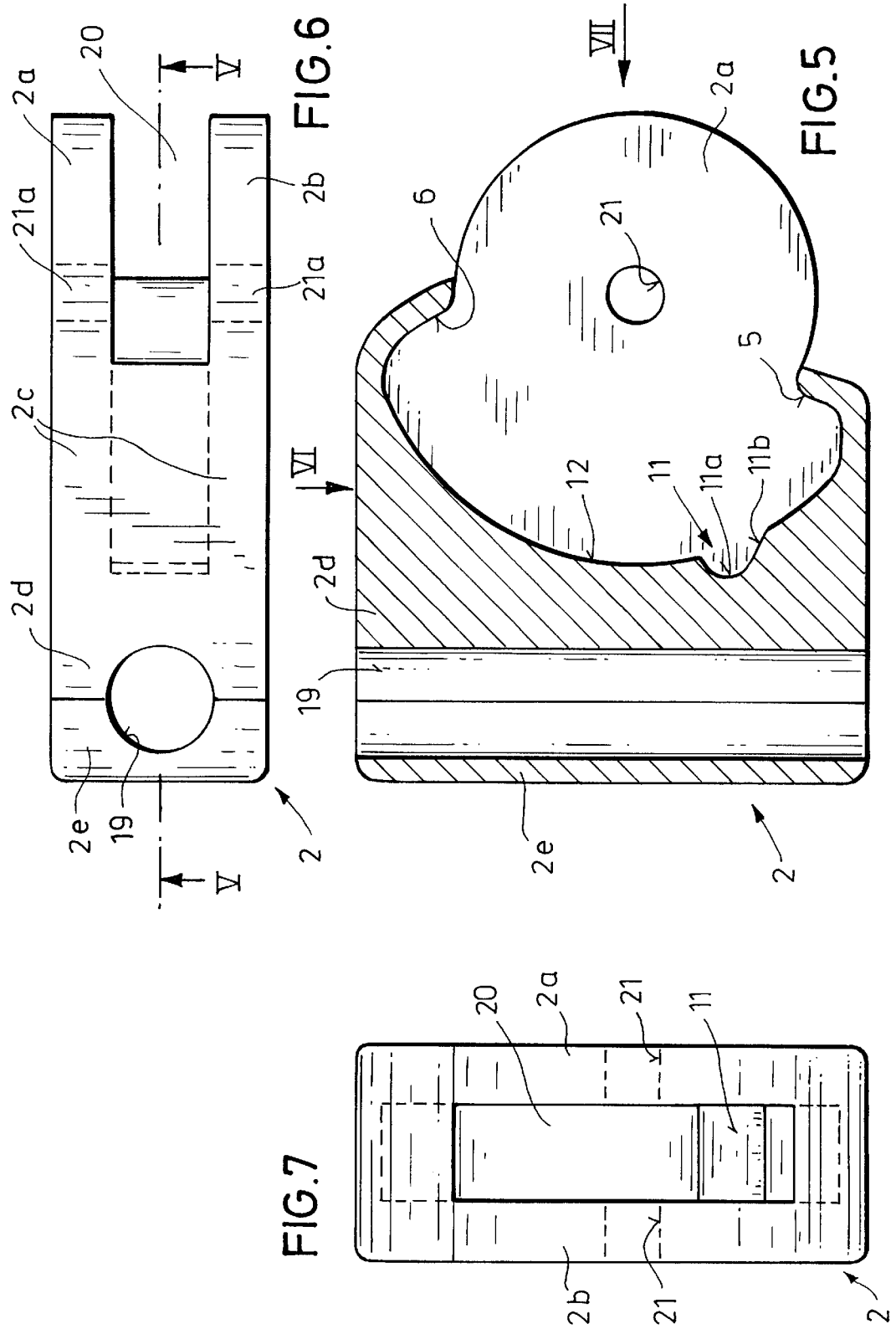

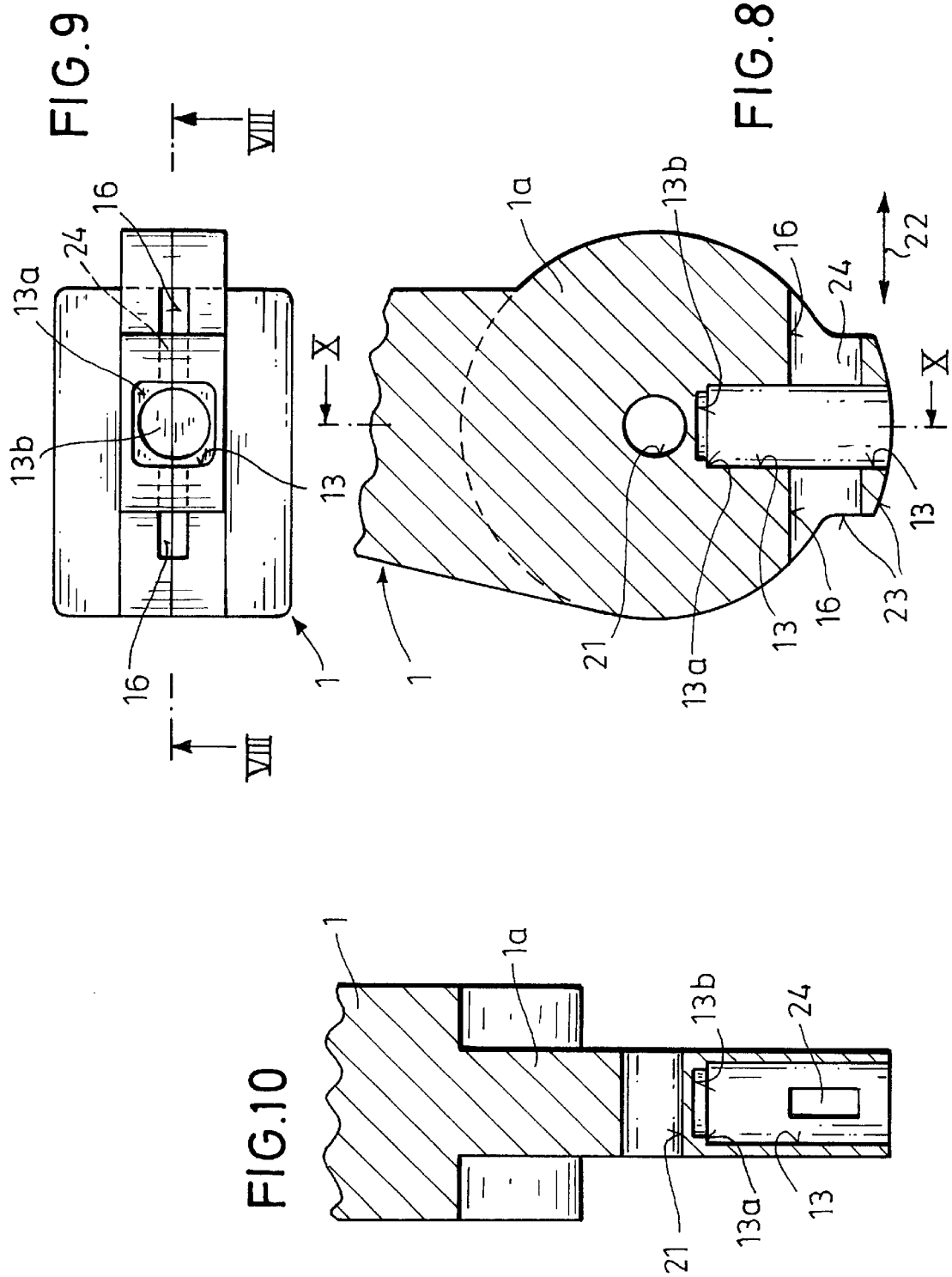

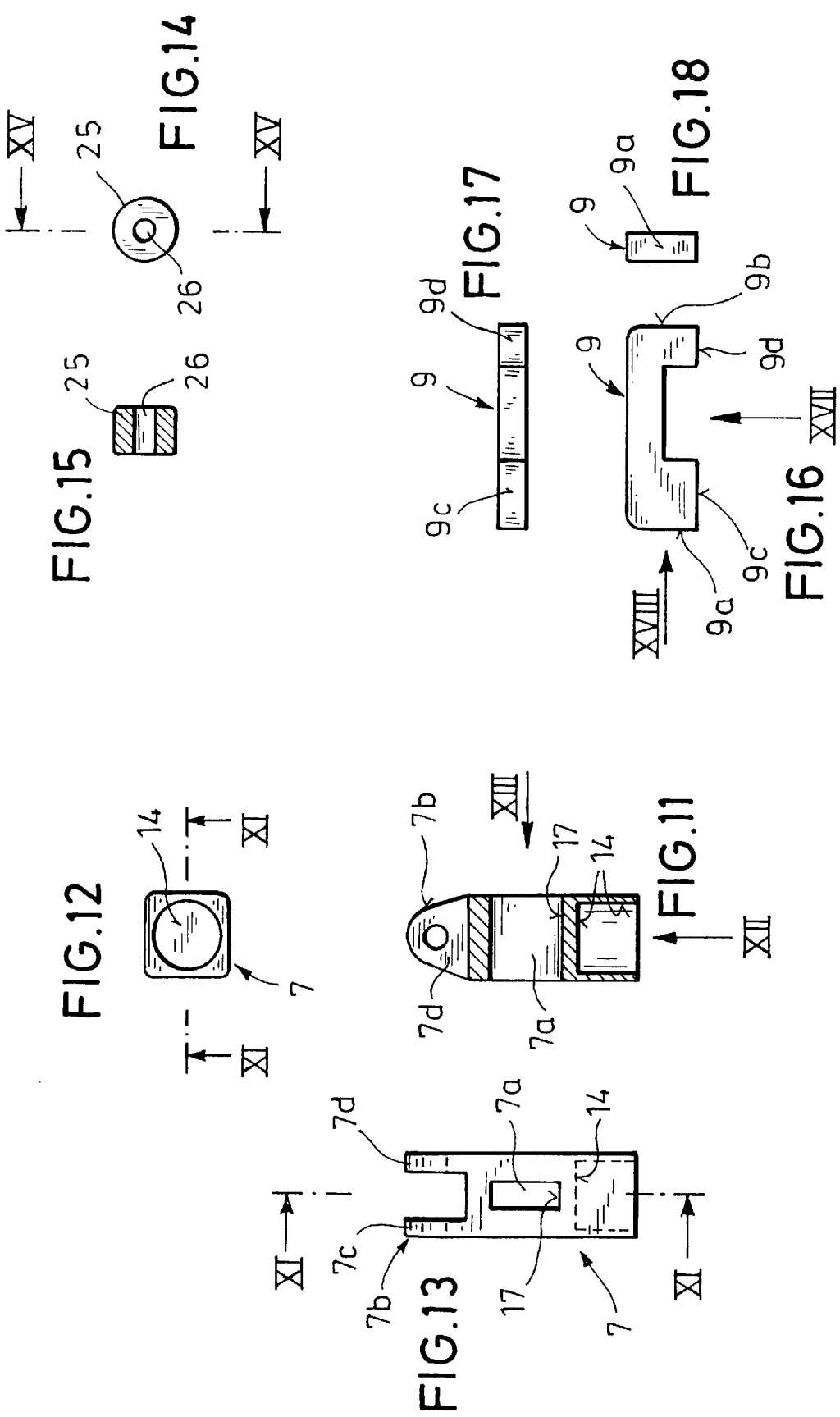

ARMREST FOR A VEHICLE SEAT

TECHNICAL FIELD

The invention relates to an armrest for a motor vehicle seat, which, with one end designed as a disk, is capable of being pivoted about a bearing journal, after the release of a locking device by raising its other end, with said end in the direction towards the seat surface, into a release position, and from there by again raising in the direction towards the seatback of the vehicle seat, about a specific pivot angle between two contact stop edges, into a locked position of use.

BACKGROUND ART

With an armrest of this kind, known from public use, the locking device consists of a pivotable engagement cam, which is arranged on the disk in a pivotable manner at a bearing pin, and in the position of use is supported by a projection at a first contact stop edge of the housing. When the other end of the armrest is raised, the engagement cam falls under its own weight against the second contact stop edge, which is formed from the free limb of a leaf spring mounted in a recess on the disk. The engagement cam is held in the release position, by this, and when the armrest is again pivoted upwards, it is pressed in front of the first contact edge of the housing into the position of use of the armrest. Because the engagement spring takes effect on the engagement cam only in the release position, protection against overload is not guaranteed. This leads to the situation in which, if the armrest is subjected to load by a person sitting on it, the engagement cam or the contact stop edge of the housing may break off, and the armrest rendered unusable. In addition to this, such a design requires an expensive aluminum decanting manufacture, of both the armrest and the housing. Finally, the engagement cam must also be manufactured from stamped steel, and the U-shaped leaf spring of spring steel.

With a second embodiment of the armrest, known from public use, of the type referred to in the preamble, the locking device consists of a sliding block capable of pivoting about a fixed-position pin in the housing, which is provided on its two narrow faces with V-shaped recesses, into which corresponding projecting contact edges of the disk of the armrest engage. In order to move the armrest from its position of use into its release position, the first contact edge of the disk, when raised, slides out of the V-shaped recess of the sliding block, in the direction of the seatback, the sliding block then being pivoted outwards as the second contact edge at the disk is raised further, out of the circular pivot path of the first contact edge of the disk, as a result of which the armrest can be pivoted downwards completely, in the direction of the seat surface, into its release position. When the armrest is raised again, the sliding block is pivoted around by the second contact edge into an engagement position with the first contact edge of the disk, so that with the subsequent repeated downwards pivoting of the armrest in the direction onto the seat, the first contact edge will engage in the other V-shaped recess, and a secure locking position, and therefore a position of use, of the armrest can again be guaranteed. This armrest likewise does not feature any overload protection, and requires, for the reinforcement of the middle section of the disk, which is made of plastic, appropriately stable and profiled insertion sheets made of steel.

Finally, an armrest of a different generic type is known from DE 39 40 895 A1, with which a locking pawl of fixed position, arranged so as to pivot about a bearing pin in the housing and under the effect of a bending spring engages in an outside tooth arrangement of the end of the armrest designed as a disk, in the position of use, and, when the armrest is raised, slides upwards against the force of a recovery spring over an oblique running surface at the disk, out of the teeth arrangement, onto a surface of the disk in the shape of a circle segment. This embodiment suffers from the disadvantage that on the one hand no overload protection is provided for the armrest, and, on the other, both the raising of the armrest into the release position as well as its pivoting downwards into its position of use is always effected against a pre-stressed recovery spring. This requires, at least at the raising of the armrest into the release position, additional force to be applied by the operating person, which under certain circumstances is not inconsiderable, which is ergonomically unfavorable. In the final analysis, this design presents an extremely complicated structure and is restricted to expensive metallic materials.

DISCLOSURE OF THE INVENTION

Taking this prior art as the basis, the objective on which the invention is based is of creating an armrest of the generic type referred to in the preamble, which with simple structural means will guarantee a reliable position of use, optionally with or without overload protection, ensures trouble-free and low-friction switching of the locking device for moving the armrest from its position of use into its release position and vice-versa, and can be made largely of plastic.

This objective is resolved, in conjunction with the generic concept according to the invention as described in the preamble, by the following features:

a) The locking device consists of a setting piston, capable of movement approximately radially to the bearing journal and under the effect of an engagement spring, with a transverse aperture and a locking slide capable of displacement therein, b) The setting piston is provided at its end turned away from the engagement spring with an engagement projection, and engages with this, under the effect of the engagement spring, into an engagement recess, c) The locking slide is capable of displacement in the transverse aperture of the setting piston between the two limbs of the pivot angle from a first contact edge into a locking fixed position, pushing the setting piston against the effect of the engagement spring, now still further prestressed, to the release position of the armrest, and d) Is capable of displacement from a second contact edge into the position of use, leading to the locking of the armrest, releasing the setting piston to the effect of the engagement spring.

By means of these features an armrest is created with which, by means of the interaction of the end of the armrest, designed as a disk, in conjunction with the setting piston and the locking slide, a compact and highly efficient locking device is created, which, according to feature d), in the position of use, the engagement spring is released to take effect on the setting piston and therefore on its engagement projection. The features a), b) and c) guarantee an armrest which can be manufactured completely out of plastic, as far as the engagement spring and the bearing journal, in economical series manufacture. No maintenance is required, because the setting piston slides within its short displacement path on plastic surfaces, as the locking slide always does, which from the outset feature low friction coefficients.

This also applies to the bearing journal made of metal, because this in turn is surrounded by an annular aperture of the disk of the armrest, said disk being made of plastic. The setting piston and the locking slide form a low-friction sliding switch with high strength, with the result that a low-friction and trouble-free switching of the armrest from its release position into its position of use and vice-versa can be effected at all times.

In an advantageous further embodiment of the invention, the setting piston features a square or rectangular external cross-section shape, and at its end turned towards the spring is provided with a recess to accommodate it, and, at its end turned away from the spring, is provided, either between two fork-shaped limbs, with a rotatable engagement roller, which engages in an engagement recess in the shape of a circle section, or with a rigid engagement projection engaging with positive fit into a corresponding positive-fit engagement recess. With the first alternative, overload protection is guaranteed, while with the second it is not.

In order for the engagement spring to be released or to be designed as weaker, it is to advantage for the axis of rotation of the engagement roller to be arranged with a smaller distance above or below the circular path in which the corresponding engagement recess is located. Due to the square or rectangular external cross-sectional shape of the setting piston, securing against rotation is provided.

The locking slide consists to advantage of a slide which is U-shaped in a front view, and otherwise cuboid in shape, of which the U-limbs feature differing widths. In conjunction with the setting piston described heretofore, the slide forms, with the disk, an extremely compact and flexurally-resistant locking device, which can extend almost across the entire width of the disk of the armrest. This locking slide is, in the release position of the setting piston, not subjected to any external forces worth mentioning, and in the locking position of the setting piston is subjected only to the force of the prestressed engagement spring. The locking slide does not take part in absorbing the forces conducted via the armrest, but is only displaced between the two end positions of the armrest, with low friction, by the two contact edges. It serves only to block or release the force of the engagement spring. The transfer of force is otherwise effected directly from the disk onto the setting piston and its engagement projection.

The faces of the two limbs of the locking slide form to advantage sliding surfaces, with which they can be pushed by the two contact edges on a counter-slide surface.

According to an advantageous further embodiment of the invention, the housing, which accommodates the end of the armrest designed as a disk and the bearing journal, features a fork-shaped housing body which encompasses the disk on both sides, and which is held at its closed web end by one of the frame bars of the seatback. As a result of this, all the parts of the locking device, namely the setting piston, the locking slide, and the spring are completely encapsulated in the housing and are therefore inaccessible to unauthorised access from the outside and therefore to incorrect operation. Reliable retention of the housing is guaranteed by the extremely compact and solidly-designed web end and by the stable frame bar of the seatback, as well as simple positioning.

According to a first advantageous embodiment of the invention, the engagement spring is supported with one of its ends in a recess of the end of the armrest which is designed as a disk, and with its other end in the recess of the setting piston, which is capable of displacement inside the same cut-out in the disk, and engages with its engagement projection in an engagement recess of the housing, whereby the first and second contact edges are arranged at the ends of a part circular path inside the housing and the slide surfaces for the locking slide are arranged in a flat cut-out on the disk of the armrest.

This embodiment guarantees, from the point of view of injection moulding technology, a simple design for the housing, of the locking slide, and of the end of the armrest designed as a disk. In mechanical terms, this embodiment features the advantage of an engagement projection arranged at a large lever arm relative to the bearing journal, which engages into an engagement recess arranged in the housing.

According to a second advantageous embodiment, the engagement spring is supported, in a kinematic reversal of the first embodiment, with one of its ends in a recess in the housing and with its other end in the cut-out on the rear end of the setting piston, which engages inside this cut-out in the housing in a displaceable manner and engages with its engagement projection in an engagement recess of the disk, whereby the locking slide is capable of displacement with sliding surfaces in circle segment shape on a circular path of the housing, and the first and second contact edge are arranged as projections at the disk of the armrest.

This embodiment does indeed feature a simple design, from the injection moulding point of view, of the end of the armrest designed as a disk, as well as of the housing, but the locking slide is of a complicated shape. In mechanical terms, this embodiment suffers in comparison with the first from the disadvantage of a shorter radial lever of the engagement projection in conjunction with the engagement recess in relation to the bearing journal.

Which of these two alternative designs is to be given preference depends both on the structural circumstances as well as on the purpose of use; in other words, for example, whether this armrest is to be used in a bus, a car, an aircraft, a train or tram, or on a chair or armchair in the domestic setting.

The effect of the engagement spring can be further increased by the engagement projection, consisting of a roller, being formed either from an entropy-elastic roller body or being provided with an entropy-elastic cylindrical casing, or being made of steel. With the first two options, two engagement springs are derived, arranged one behind another, so that a total spring hardness can be created without additional spatial requirement, in a rich range of variants, because in this case the entropy-elastic spring hardness of the roller takes effect as an additional engagement spring.

To guarantee overload protection for the armrest, for example if it is used as a seat, contrary to its intended purpose, the engagement spring or springs are pre-tensioned with the engagement projection in the engaged position, with such a spring force as will retain the armrest in its engagement position under a pressure force exerted on its free end of, for example, 5 kg, and only when this pressure force is exceeded will the engagement spring be compressed further under the effect of the returning setting piston, the engagement projection will be disengaged from the engagement recess into the release position of the armrest, and the latter will pivot downwards in the direction of the seat. As a result of this, the risk of breakage of the armrest and of the locking device in the event of improper use will be avoided.

The pressure force indicated of, for example, 5 kg, is therefore to be understood as indicative, since the person skilled in the art is at liberty to increase or reduce this pressure force by a corresponding spring pre-tension. The decisive factor is that the pressure force is to be dimensioned on the one hand in such a way that the support for the arm of a person will always be guaranteed, without the armrest disengaging from its locking position. On the other hand, account must also be taken of whether a child or an adult might make improper use of the armrest as a seat. If, for example, the pressure force on the armrest is increased to 30 kg, it would be possible for a child to sit on it, and, in the event of the armrest suddenly disengaging, the child would fall and might be involved in an accident. In order to exclude the risk of such accidents, the pressure force should always be set such that the locking device already disengages from the locking position under the weight of a child, without it suddenly falling down without warning, and, on the other hand, is still set sufficiently high for reliable support for the arm of an adult to be guaranteed. Such a pressure force is between about 3 kg and 5 kg.

The engagement spring and the bearing journal are made to advantage of steel, while by contrast all other parts are made of impact-resistant and form-stable plastic.

According to a particularly advantageous embodiment of the invention, the housing, the armrest, and the setting piston are made of polyamide 6 (PA6) with fibreglass reinforcement, or of polybutylene terephthalate (PBTP) and the locking slide of polyoxymethylene (POM). The latter material for the locking slide has proved to be especially suitable for sliding on PA6 or PBTP.

BRIEF DESCRIPTION OF THE DRAWINGS

A number of embodiments of the invention are represented in the drawings. These show:

FIG. 5 is a sectional view of the housing along the line V/V of FIG. 6.

FIG. 6 is a plan view in the direction of the arrow VI of FIG. 5.

FIG. 7 is a face view of the housing in the direction of the arrow VII of FIG. 5.

FIG. 8 is a sectional view through the end of the armrest designed as a disk, in the direction of the arrows VIII/VIII of FIG. 9.

FIG. 9 is an elevational view of the disk taken from the bottom of FIG. 8.

FIG. 10 is a sectional view of the disk in the direction of the arrows X/X of FIG. 8.

FIG. 11 is a sectional view of the setting piston along the line XI/XI of FIGS. 12 and 13.

FIG. 12 is an underview of the setting piston in the direction of the arrow XII of FIG. 11.

FIG. 13 is a side view of the setting piston in the direction of the arrow XIII of FIG. 11.

FIG. 14 is a side view of a roller as engagement projection.

FIG. 15 is a sectional view of the roller in the direction of the arrows XV/XV of FIG. 14.

FIG. 16 is a side view of the locking slide.

FIG. 17 is an underview of the locking slide in the direction of the arrow XVII of FIG. 16.

FIG. 18 is a side view of the locking slide in the direction of the arrow XVIII of FIG. 16.

PREFERRED EMBODIMENT FOR CARRYING OUT THE INVENTION

Figure 1:
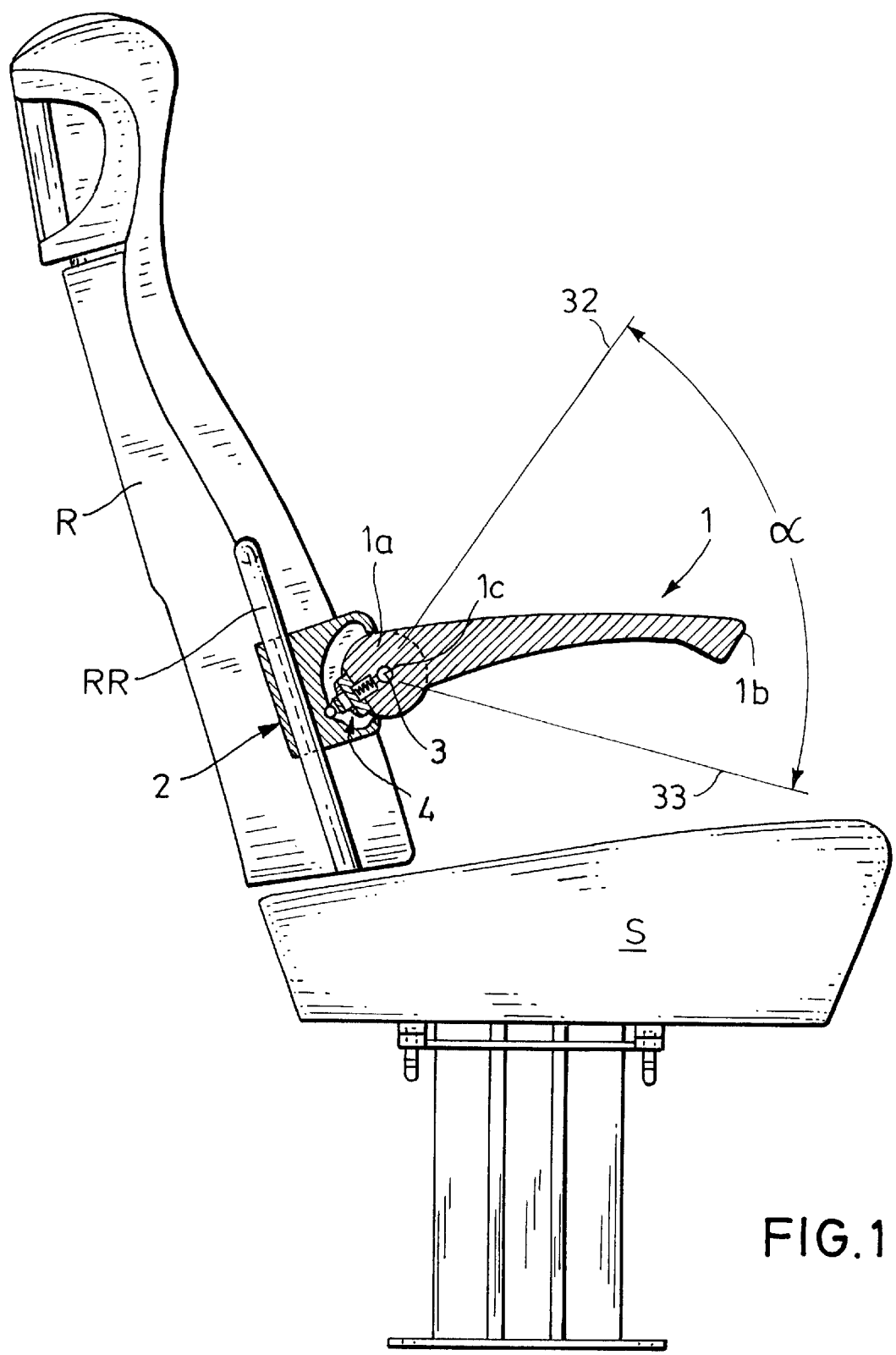
FIG. 1 is as side view of a seat with the armrest with the side wall of the housing removed.

FIG. 1 shows a schematic representation of a seat S with seatback R, at the frame tube RR of which an armrest 1 is held, for the right arm of a person. This armrest 1 is designed with its end 1a as a disk, which is mounted at a bearing journal 3 in a housing 2, capable of pivoting movement. By raising the other end 1b of the armrest in a counter-clockwise direction towards the seatback R, the locking device, designated overall by 4, is released in such a way that the end 1b of the armrest 1 can then be pivoted downwards clockwise in the direction of the seat S, in order thereby to allow the person concerned to make a lateral movement out of the seat S, into an adjacent aisle, for example. This position of the end 1b of the armrest 1, pivoted downwards in the direction of the seat S, is pivoted, by raising again in the counter-clockwise direction towards the seatback R, about a specific pivot angle a between two limbs 32, 33, into the locked position of use again, shown in FIG. 1.

Figure 2:
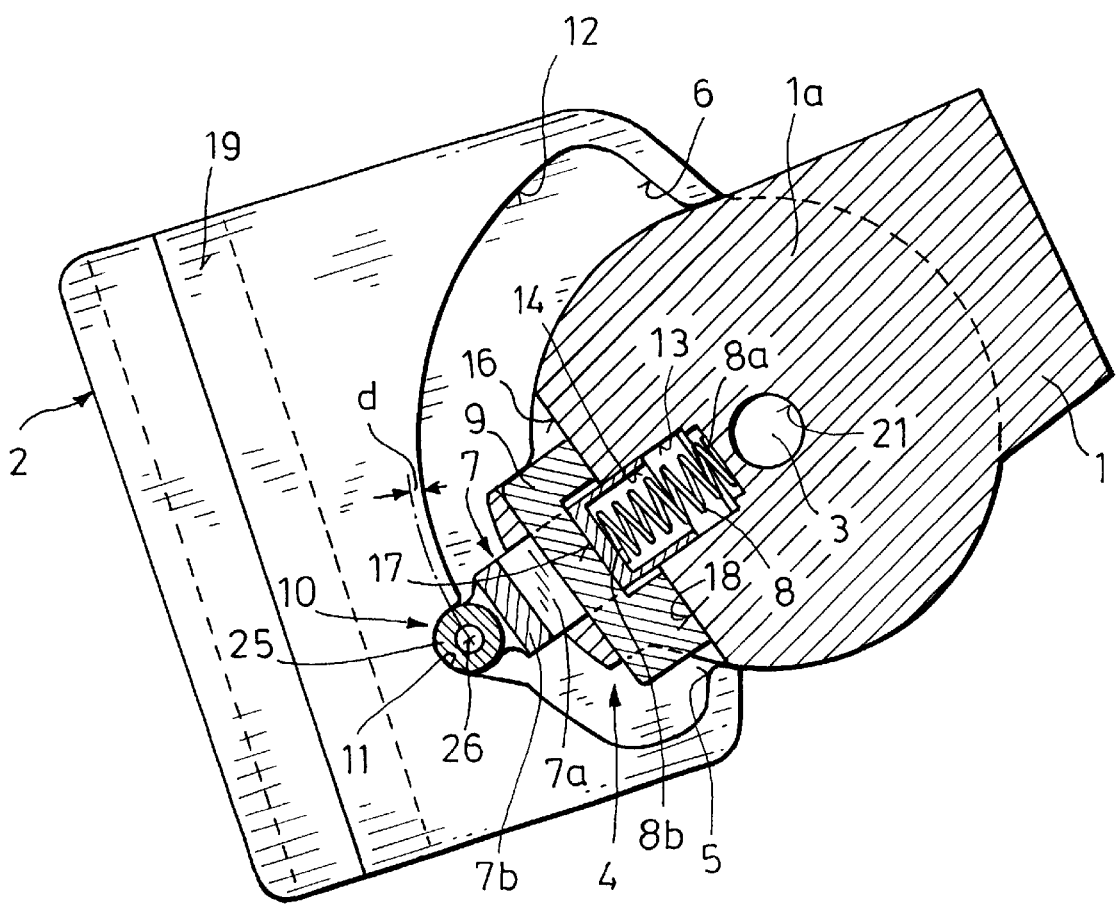
FIG. 2 is a sectional view through the end of the armrest of FIG. 1 with its end designed as a disk, in which the recess for the accommodation of the locking spring and the setting piston is provided, as well as the sliding surface for the locking slide, while by contrast the engagement recess, with a roller of the setting piston engaged in it, in the position of use, is shown in a part circular path of the housing.
Figure 3:
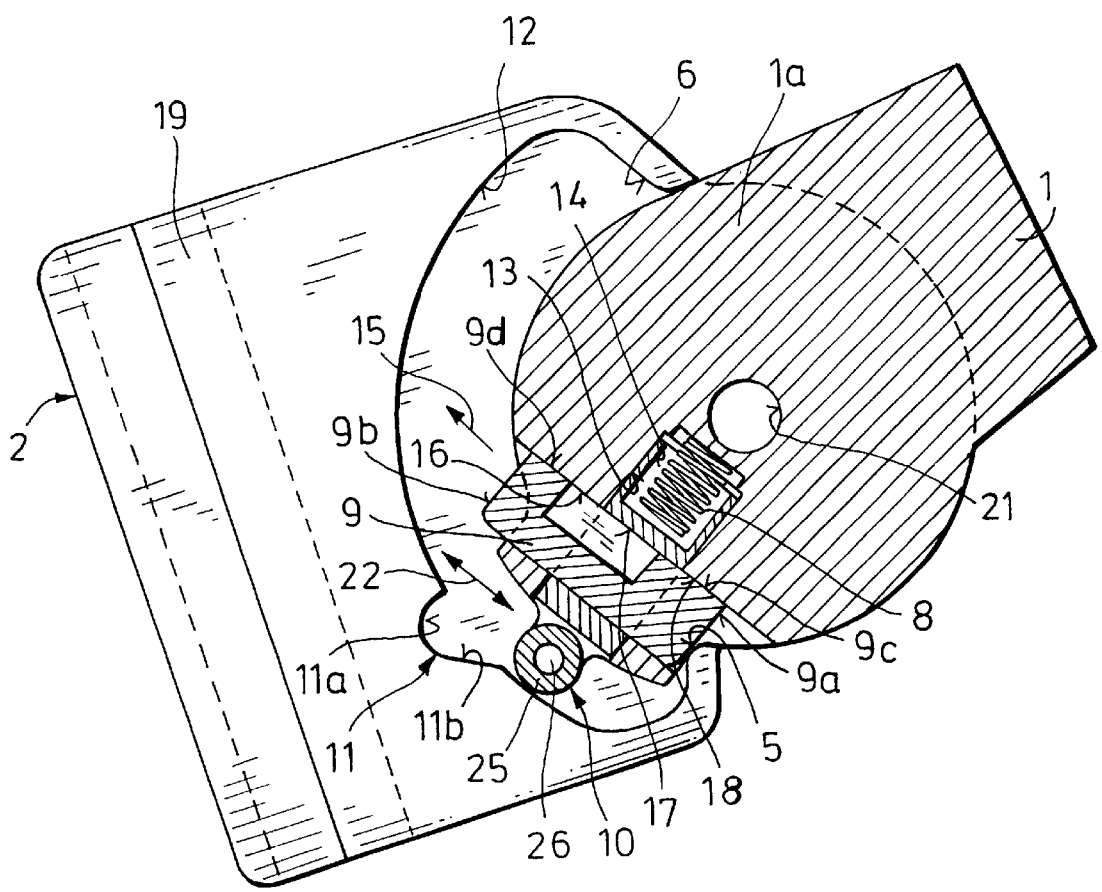
FIG. 3 is the view in FIG. 2 after the raising of the armrest in the direction towards the seat back, with the engagement projection already disengaged from the engagement recess and with the locking slide displaced by the firs contact edge into its locking position for locking the setting piston.
Figure 4:
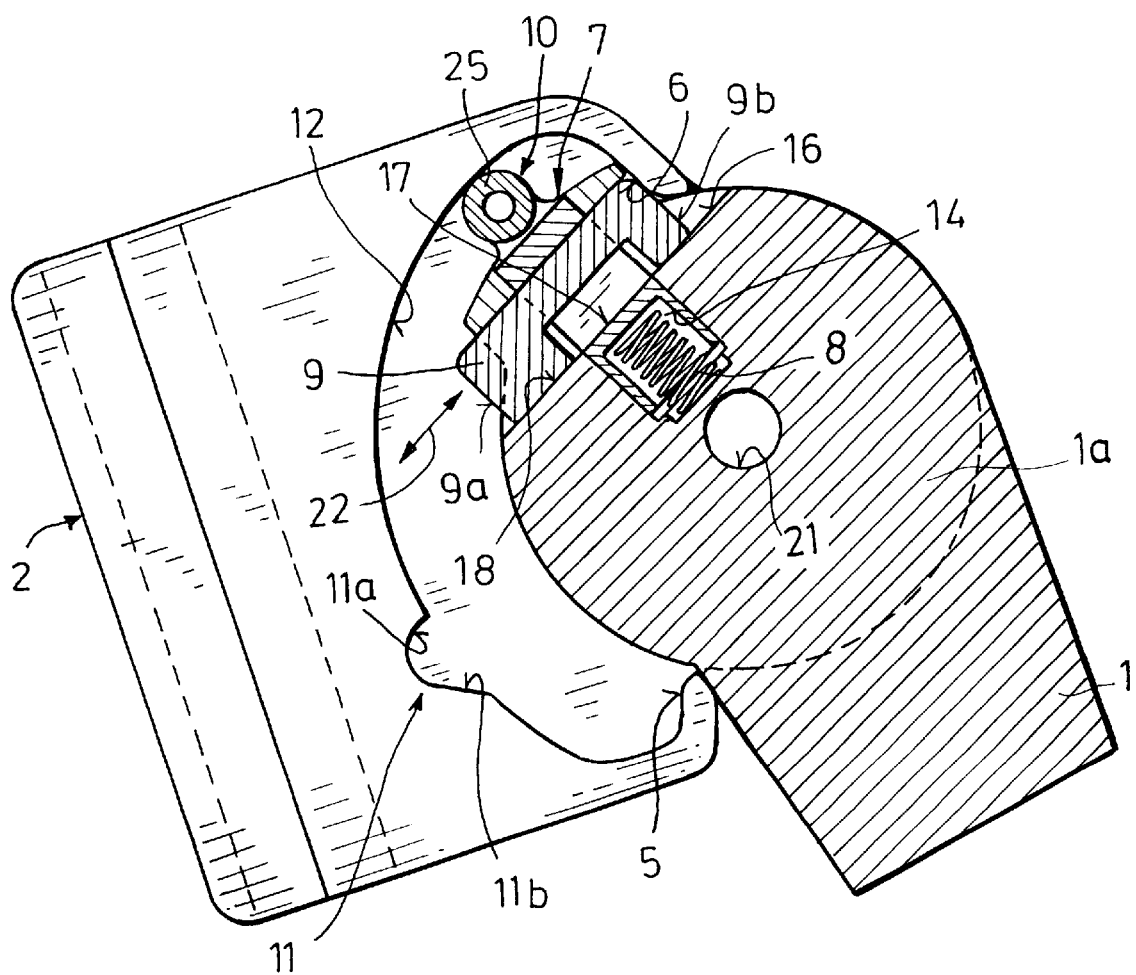
FIG. 4 is a view of the locking device after the armrest has been folded down and the locking slide run up against the second contact edge, as a result of which the setting piston has been released and the engagement spring can again take effect on it and on the engagement projection, until repeat raising in the direction towards the seat back attains the position of use of FIG. 2.

In a first embodiment according to FIGS. 2 to 4, the locking device 4 consists of a setting piston 7, movable approximately radially to the bearing journal 3 and under the effect of an engagement spring 8, with a transverse aperture 7a and a locking slide 9 capable of displacement therein.

At its end 7b turned away from the engagement spring 8, the setting piston 7 is provided with an engagement projection 10, which in the case shown is designed as a roller 25. This roller 25 engages in an engagement recess 11, under the effect of the engagement spring 8. This engagement recess 11 is formed, according to FIGS. 3, 4, and 5, of a circular section 11a and an oblique run-on surface 11b, directed towards the lower contact edge 5. This run-on surface 11b serves to facilitate the disengagement of the engagement projection 7b from its position shown in FIG. 2 into its position shown in FIG. 3.

The position of FIG. 3 is attained by raising the end 1b of the armrest 1, as a result of which it is pivoted in the counter-clockwise direction about the bearing journal 3. During this pivoting movement, the engagement projection 10, in this case the roller 25, of the setting piston 7, disengages from the semi-circular recess 11a and passes over the oblique run-on surface 11b onto a circular path 12 in the housing 2. At this disengagement, the setting piston 7 is pressed deeper into a cut-out 13 in the disk 1a, and so compresses the engagement spring 8 more strongly. This engagement spring 8 is supported with one end 8a on the blind hole bottom 13b of this cut-out 13, and with its other end 8b on the bottom of a recess 14 inside the setting piston 7.

In the position shown in FIG. 3, the locking slide 9 strikes with its face 9a against the contact edge 5, as a result of which it is displaced inside the transverse aperture 7a in the setting piston 7 in the direction of the arrow 15. Due to the fact that, when the engagement roller 25 runs onto the circular path 12 inside the housing 2, the sliding surface 17 in the transverse aperture 7a of the setting piston 7 is pressed downwards into the same plane of the sliding surfaces 16 and 18 in the passage aperture 24 in the disk 1a, the locking slide 9 can be displaced with no problem by the first contact edge 5 into the position shown in FIG. 3.

This locking slide 9, which is shown in detail in FIGS. 16 to 18, consists, in the view in FIG. 16, of a U-shaped and otherwise cuboid slide, the U-limbs 9c, 9d of which feature differing widths. Because of these differing widths, the U-limb 9c according to FIG. 3 projects with a part of its width into the transverse aperture 7a of the setting piston 7, so that it is blocked in the direction of its movement path according to the double arrow 22. As a result, the armrest 1 can be pivoted downwards according to FIG. 1, clockwise with its end 1b, with no problem towards the seat S, because the engagement roller 25 is now moving on the circular path 12 of the housing 2, and cannot engage in the engagement recess 11a. As a result, the armrest 1 according to FIG. 4 can be pivoted downwards in a clockwise direction towards the seat S with its end 1b from FIG. 1.

After this downwards pivoting movement, the locking device 4 adopts the position shown in FIG. 4. In this situation, the locking slide 9 runs with its other face 9b against the second contact edge 6 and is displaced by this into the position shown in FIG. 4, inside the transverse aperture 7a of the setting piston 7. Due to this displacement, the setting piston 7 is unblocked by the locking slide 9, and the engagement spring 8 is again released to take effect on the setting piston 7 and therefore on the engagement roller 25. The armrest 1 is then pivoted upwards out of the position shown in FIG. 4 in the direction of the seatback R with its end 1b, counter-clockwise. In this situation, the engagement roller 25 slides downwards on the circular path 12 inside the housing 2, until it engages into the part 11a of the engagement recess 11 according to FIG. 2, into its position of use.

In this position of use according to FIG. 2, the engagement spring 8 is subjected to preliminary tension in such a way that the armrest 1, when subjected to normal use, is held in this position according to FIG. 1. If, by contrast, it is subjected to a load exceeding a specific preliminary tension force, due to improper use, the engagement roller 25, as an engagement projection 10, is pushed out of the engagement recess 11a, under compression of the engagement spring 8, and the armrest 1 is pushed downwards with its end 1b, in a clockwise direction. In this case, the locking device 4 functions as an overload protection, as a result of which damage to the armrest 1 and the housing 2 will be avoided.

The housing 2, which accommodates the end 1a of the armrest 1, designed as a disk, features, according to FIGS. 5 to 7, a housing body 2c, encompassing the disk 1a on both sides in fork fashion with the housing cheeks 2a, 2b, said housing body being held at its closed and divided web end 2d, 2e by the frame rod RR, according to FIG. 1, of the seatback R. The divided web end 2d, 2e according to FIG. 6 is held together by screws, not shown, clamping the frame tube RR in the circular passage aperture 19.

The bearing journal 3 of FIG. 1 is conducted in the two circular apertures 21a of the two housing cheeks 2a, 2b. In the intermediate space 20 between the two housing cheeks 2a, 2b, the disk 1a is inserted in the armrest 1, and can be pivoted with its locking device 4 between the two contact edges 5, 6, about the angle a between the angle limbs 32, 33.

The disk 1a of the armrest 1 is shown in FIGS. 9 and 10. It is held in its passage aperture 21 between the two side cheeks 2a, 2b of the housing body 2c according to FIG. 6 by the bearing journal 3 according to FIG. 1, and is capable of being pivoted about this bearing journal 3 in both the counter-clockwise and clockwise directions.

The disk 1a features a cylindrical cut-out 13 running radially to the aperture 21, with square or rectangular cross-section, in which the setting piston 7, with corresponding square or rectangular external cross-sectional shape, can be displaced. In addition, the disk 1a is provided with an area 23 projecting beyond its external circumference, in which a passage aperture 24 for the locking slide 9 is located, running transverse to the cur-out 13, the locking slide being capable of displacement therein in both directions of the double arrow 22.

As can be seen from FIG. 9, the base 13a is provided with a square cut-out 13 with a short circular blind hole 13b for the slip-free and secure accommodation of the end 8a of the engagement spring 8, designed as a cylindrical screw spring.

As can be seen from FIG. 10 in conjunction with FIG. 6, the disk 1a is inserted between the side cheeks 2a, 2b of the housing 2, in a precise fit, whereby the part of the armrest 1 connecting to this features the same width as the housing 2. As a result of this, a continuous link is ensured between the housing 2 and the armrest 1.

The setting piston 7 is shown in three views in FIGS. 11 to 13.

As can be seen from Fig. 11 in conjunction with FIG. 12, the recess 14 for accommodating the engagement spring 8 is designed as circular, so that a secure and kink-free guide is assured for the engagement spring 8.

At its end 7b, the setting piston 7 is provided with two fork-shaped limbs 7c, 7d, between which, as engagement projection 10, the engagement roller 25 as shown in FIGS. 14 and 15 is held in rotatable fashion by means of a bearing pin, not shown. As a result, a low-friction engagement of this roller 25 with the circular path 12 and the engagement recess 11 in the housing 2 is guaranteed.

As can be seen from FIG. 2, the mid-point 26 of the axis of rotation of the engagement roller 25 is located on a circular path, which is larger by a slight interval d than the circular path 12 inside the housing 2. As a result, the engagement roller 25 and therefore the setting piston 7 and therefore also the disk 1a are reliably held in place with the armrest 1 in the semi-circular engagement recess part 11a, and cannot be disengaged from this without addition pretension of the engagement spring 8 to overcome the dead point, for the armrest 1 to undergo a pivoting movement in the clockwise direction. Disengagement without overcoming this dead point is only possible for the engagement roller 25 with a pivoting movement of the armrest 1 counter-clockwise on the oblique run-on surface 11b, in such a way as has been described for FIG. 3. In this way, the engagement roller 25 guarantees, in combination with this overcoming of the dead point and additional pre-tension of the engagement spring 8, the overload protection of the armrest 1, already described several times, in the event of improper use.

Figure 19:
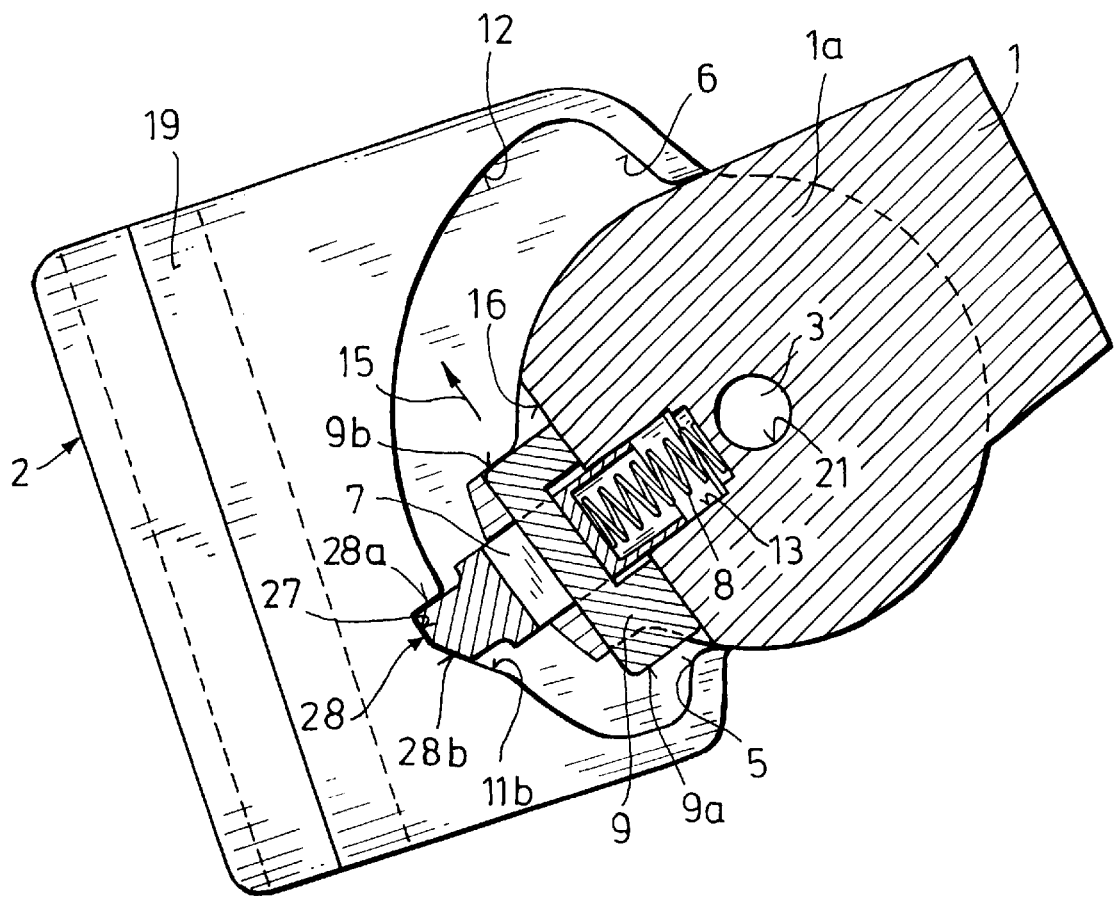
FIG. 19 depicts an embodiment according to FIG. 2, but with a positive-fit engagement projection engaging in an engagement cut-out, without overload projection.

If such overload protection is not desired, the embodiment according to FIG. 19 comes into consideration. In this case, the engagement projection 10 is designed as a rigid engagement cam 28, engaging by positive fit in a corresponding positive-fit engagement recess 27, the engagement nose 28a of said cam running approximately perpendicular to the circular path 12 inside the housing 2. This engagement cam 28 can be disengaged with its slide plane 28b only on the oblique plane 11b if the armrest 1 is pivoted in the counter-clockwise direction out of its locking arrangement. Then, as soon as the face edge 9a of the locking slide 9 travels against the first contact edge 5 of the housing 2, the locking slide 9 is displaced in the direction of the arrow 15, as described in reference to FIG. 3, whereupon the setting piston 7 is secured against the force of the still more strongly pre-tensioned engagement spring 8 of the locking slide 9. In this locking securing situation, the armrest 1 is in its release position, and can be pivoted downwards in a clockwise direction. Only when the other face 9b of the locking slide 9 strikes against the second contact edge 6 will the locking effect of the engagement spring 8 and the setting piston 7 be released again in the manner described in FIG. 4. Otherwise, concordant parts are designated with identical reference numbers.

Figure 20:
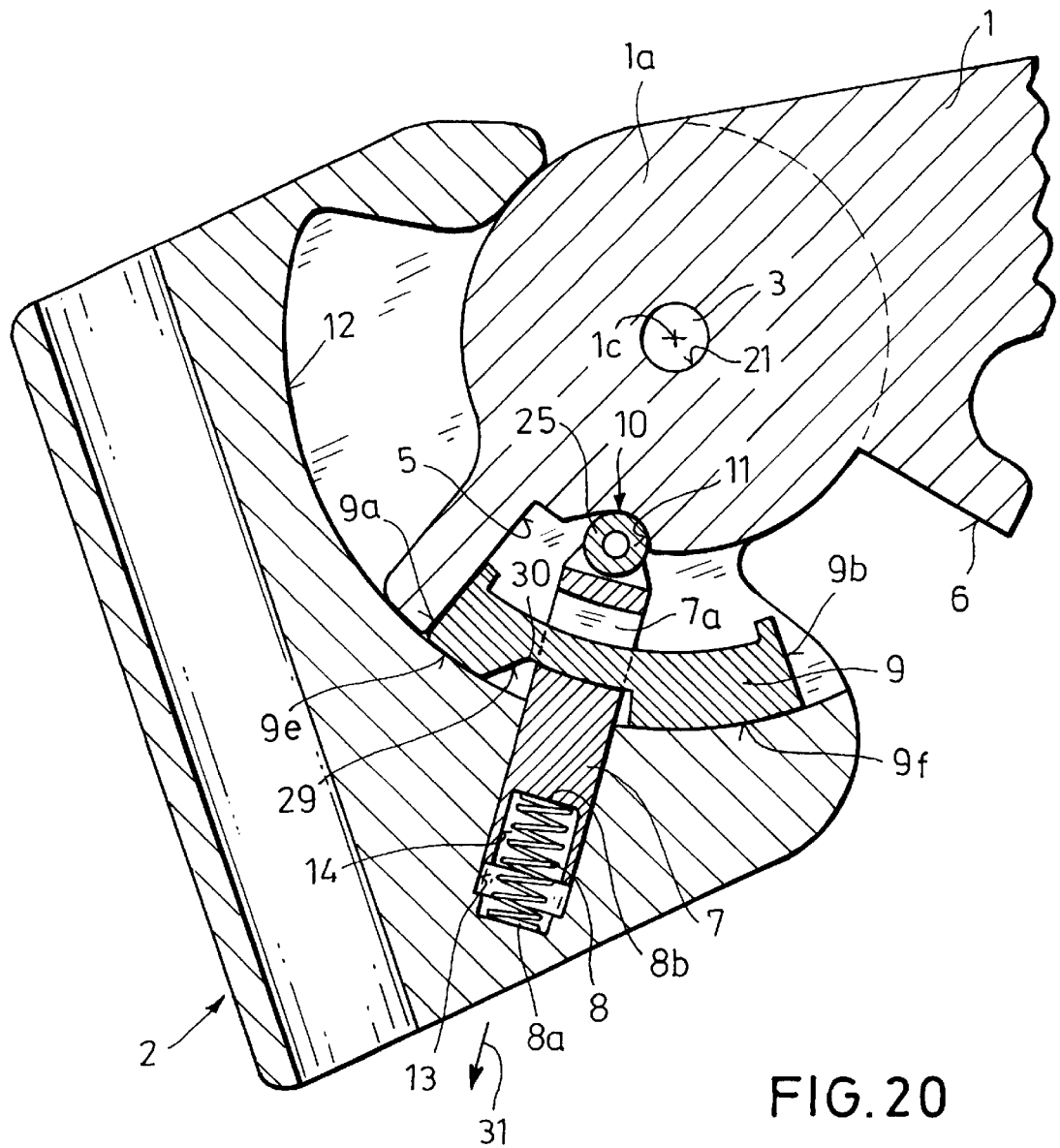
FIG. 20 depicts a kinematic reversal of the embodiment of FIGS. 2 to 4, in which, by contrast, the setting piston and the engagement spring are arranged in a cut-out of the housing, the engagement projection engages in an engagement recess in the disk of the armrest, the contact edges are located on the disk, and the locking slide, with circle segment sliding surfaces, slides on a partial circular path of the housing.

In FIG. 20, a further embodiment of the armrest 1 is shown, in the form of a kinematic reversal embodiment of FIGS. 2 to 4. With this embodiment, the engagement spring 8 is supported with one end 8a on the bottom of a cut-out 13, which is in the housing 2. It is supported by its other end 8b on the bottom of a blind hole of the cut-out 14 in the setting piston 7. The cut-out 13 in the housing 2 is designed in cross-section in the same way as the cut-out 13 of the embodiment in FIGS. 2 to 4, rectangular or square, as is the outer cross-section shape of the setting piston 7 likewise. This setting piston 7 is now capable of displacement inside this cut-out 13 of the housing, and engages with its engagement projection 10, in the form of an engagement roller 25, in an engagement recess 11 of the disk 1a. The locking slide 9, with sliding surfaces 9e, 9f of circle segment type, is capable of displacement on the circular path 12 in the housing 2. If, with this embodiment, the armrest 1 is raised at its end 1b in the counter-clockwise direction, the first contact edge 5, now arranged at the disk 1a, travels against the face edge 9a of the locking slide 9, which with its slide edge 29 pushes down the upwards facing edge 30 of the setting piston 7 in the direction of the arrow 31, against the effect of the engagement spring 8, until the sliding surface 9e, in the form of a circle segment, engages in the transverse aperture 7a of the setting piston 7. In this position, the setting piston 7 is locked, until the second contact edge 6 pushes the locking slide 9 outwards, when the armrest 1 pivots in the clockwise direction, out of the transverse aperture 7a of the setting piston 7, on encountering the face 9b. As a result, the engagement roller 25 again engages in the engagement recess 11 of the disk 1a, under the effect of the engagement spring 8.

The two limbs 32, 33 of the limb angle a according to FIG. 1 are formed, in the embodiment of FIG. 20, by the two contact edges 5, 6, in relation to the point of rotation 1c of the disk 1a.

In light of the foregoing, it should thus be evident that an armrest constructed as described herein substantially improves the art and otherwise accomplishes the objects of the present invention.

What is claimed is:

1. An armrest for a motor vehicle seat, which is capable of pivoting with its end designed as a disk about a bearing journal arranged in a housing, after the release of a locking device by raising the other end of the armrest in the direction towards the seat surface, into a release position, and from there, by again raising in the direction of the seatback of the vehicle seat, about a specific pivot angle between two contact edges, into a locked position of use, characterized in that a) the locking device includes a setting piston, capable of being moved approximately radially to the bearing journal in a cylindrical aperture, and under the effect of an engagement spring, with a transverse aperture and a locking slide capable of displacement therein;

b) the setting piston is provided with an engagement projection at the end opposed to the engagement spring, and engages with this engagement projection in an engagement recess under the effect of the engagement spring;

c) the locking slide is capable of displacement in the transverse aperture of the setting piston, between two limbs of a pivot angle of a first contact edge, into a locking position, for the release of the armrest, displacing the setting piston against the effect of the engagement spring which is then still further pre-tensioned, and;

d) the locking slide is capable of displacement by a second contact edge into the position of use, releasing the setting piston to take effect on the engagement spring, leading to the locking of the armrest.

2. The armrest according to claim 1, characterized in that the setting piston features a square or rectangular external cross-section form, and is provided at an end adjacent to the spring with a recess to accommodate the spring, and at its end turned away from the spring, either between two fork-shaped limbs, with a rotatable engagement element, engaging in an engagement recess.

3. The armrest according to claim 1, characterized in that the locking slide includes a slide which is U-shaped in front view, and otherwise cuboid in shape, the U-limbs of which feature differing widths.

4. The armrest according to claim 3, characterized in that the face surfaces of the two limbs of the locking slide form slide surfaces by means of which the limbs are capable of displacement on a counter-slide surface of the two contact edges.

5. The armrest according to claim 1, characterized in that the housing which accommodates the end of the armrest designed as a disk and the bearing journal, features two housing cheeks which encompass the disk in a housing body in fork fashion on both sides, the closed web end of the housing being held in a passage aperture of a frame bar of the seatback.

6. The armrest according to claim 1, characterized in that the engagement spring is supported with one end in a cut-out of the end of the armrest designed as a disk, and with the other end of the spring supported in a recess of the setting piston, which engages inside said cut-out in the disk in a displaceable manner and with its engagement projection engaging in an engagement recess of the housing, whereby the first and second contact edges for the locking slide are arranged at the ends of a partly circular path inside the housing and the slide surfaces for the locking slide are arranged in a passage aperture running transverse to the cut-out in the disk of the armrest.

7. The armrest according to claim 1, characterized in that the engagement spring is supported with one end in a cut-out in the housing and with the other end of the spring in a recess at the back end of the setting piston, which can be displaced inside said cut-out in the housing and engages with the engagement projection of the setting piston in an engagement recess of the disk, whereby the locking slide is capable of displacement with slide surfaces in circle segment form, on a circular path of the housing, and the first and second contact edges are designed as projections at the disk of the armrest.

8. The armrest according to claim 1, characterized in that the engagement projection consisting of a roller includes an entropy-elastic roller body.

9. The armrest according to claim 1, characterized in that the engagement spring, in the engaged position of the engagement projection, is subjected to pre-tension with such a spring force, which will hold the armrest in the position of rest under a pressure force exerted on the free end of the armrest of up to approximately 5 kg and that only when this pressure force is exceeded will the engagement spring, under the effect of the setting piston sliding back, be further compressed, and will push the engagement projection out of the engagement recess into the release position of the armrest, and enable the armrest to pivot in the direction of the seat.

10. The armrest according to claim 1, characterized in that the engagement spring and the bearing journal are made of steel, while by contrast the armrest, the housing, the locking device, the contact edges, the setting piston, and the locking slide are made of impact-resistant and form-stable plastic.

11. The armrest according to claim 10, characterized in that the housing, the armrest, and the setting piston are made of polyamide 6 with fibreglass reinforcement, and the locking slide is made of polyoxymethylene.

12. The armrest according to claim 10, characterized in that the housing, the armrest, and the setting piston are made of polybutyl enterephthalate.

13. The armrest according to claim 1, characterized in that the engagement projection consisting of a roller includes an entropy-elastic cylindrical sheath.

14. The armrest according to claim 1, characterized in that the engagement projection consists of a roller made of steel.

* * * * *